US011431869B2

(12) United States Patent
Suzuki

(10) Patent No.: US 11,431,869 B2
(45) Date of Patent: Aug. 30, 2022

(54) COLOR PARAMETER GENERATION APPARATUS, EXECUTION APPARATUS AND NON-TRANSITORY COMPUTER-READABLE RECORDING MEDIUM

(71) Applicant: KONICA MINOLTA, INC., Tokyo (JP)

(72) Inventor: Kouyo Suzuki, Aichi (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 17/327,222

(22) Filed: May 21, 2021

(65) Prior Publication Data
US 2021/0377413 A1  Dec. 2, 2021

(30) Foreign Application Priority Data
May 26, 2020 (JP) .............................. JP2020-091312

(51) Int. Cl.
*H04N 1/60* (2006.01)
*H04N 1/00* (2006.01)

(52) U.S. Cl.
CPC ......... *H04N 1/00811* (2013.01); *H04N 1/603* (2013.01); *H04N 1/6066* (2013.01)

(58) Field of Classification Search
CPC ... H04N 1/00811; H04N 1/603; H04N 1/6066
See application file for complete search history.

(56) References Cited

U.S. PATENT DOCUMENTS

| 6,249,315 B1* | 6/2001 | Holm | H04N 9/735 348/E9.037 |
|---|---|---|---|
| 6,560,357 B1* | 5/2003 | Yamazaki | H04N 1/12 358/518 |
| 10,893,193 B2* | 1/2021 | Jinno | H04N 1/6019 |
| 2002/0080168 A1* | 6/2002 | Hilliard | H04N 1/603 345/589 |
| 2006/0222260 A1* | 10/2006 | Sambongi | G06T 5/006 382/274 |
| 2007/0154109 A1* | 7/2007 | Ovsiannikov | H04N 1/6086 382/168 |
| 2011/0242352 A1* | 10/2011 | Hikosaka | H04N 5/3572 348/222.1 |
| 2015/0116779 A1* | 4/2015 | Shibuya | H04N 1/6036 358/2.1 |

(Continued)

FOREIGN PATENT DOCUMENTS

| EP | 1528797 A2 * | 5/2005 | ............. G06T 5/003 |
|---|---|---|---|
| EP | 3166300 A1 * | 5/2017 | ......... H04N 1/00023 |

(Continued)

*Primary Examiner* — Ted W Barnes
(74) *Attorney, Agent, or Firm* — Buchanan Ingersoll & Rooney PC

(57) ABSTRACT

A color parameter generation apparatus includes a hardware processor that generates color parameters to be used for printing a sample image based on a read image, in which the hardware processor determines a flare degree at a predetermined position of the read image, and executes predetermined processing for correcting the color parameters in the predetermined position based on the determined flare degree.

13 Claims, 10 Drawing Sheets

(56) References Cited

U.S. PATENT DOCUMENTS

| | | | |
|---|---|---|---|
| 2015/0358489 A1* | 12/2015 | Isokawa | H04N 1/40 |
| | | | 358/474 |
| 2016/0212303 A1* | 7/2016 | Tsuchiya | G03G 15/01 |
| 2017/0026592 A1* | 1/2017 | Kuang | H04N 5/3572 |
| 2017/0134618 A1* | 5/2017 | Tsuji | H04N 1/6086 |
| 2018/0013926 A1* | 1/2018 | Yamaguchi | G06T 7/90 |
| 2019/0259168 A1* | 8/2019 | Ichihashi | G06T 7/40 |
| 2019/0268502 A1* | 8/2019 | Shirasawa | H04N 1/603 |
| 2019/0268535 A1* | 8/2019 | Jinno | H04N 1/6019 |
| 2019/0378468 A1* | 12/2019 | Jinno | G06T 11/001 |
| 2021/0377413 A1* | 12/2021 | Suzuki | H04N 1/00811 |

FOREIGN PATENT DOCUMENTS

| | | | | |
|---|---|---|---|---|
| JP | 2016159540 A | | 9/2016 | |
| JP | 2018011101 A | * | 1/2018 | G06T 7/90 |
| WO | WO-2021193289 A1 | * | 9/2021 | |

* cited by examiner

PERIPHERAL PATCH
PREDETERMINED PATCH

FIRST TARGET PROFILE

| (C,M,Y,K) | (L*,a*,b*) |
|---|---|
| . | . |
| . | . |
| . | . |
| (A,B,C,D) | (X1,Y1,Z1) |
| . | . |
| . | . |
| . | . |

SECOND TARGET PROFILE

| (C,M,Y,K) | (L*,a*,b*) |
|---|---|
| . | . |
| . | . |
| . | . |
| (A,B,C,D) | (X2,Y2,Z2) |
| . | . |
| . | . |
| . | . |

FIG. 5

COLOR PARAMETER GENERATION APPARATUS, EXECUTION APPARATUS AND NON-TRANSITORY COMPUTER-READABLE RECORDING MEDIUM

CROSS REFERENCE TO RELATED APPLICATIONS

The entire disclosure of Japanese Patent Application No. 2020-091312, filed on May 26, 2020, is incorporated herein by reference in its entirety.

BACKGROUND

Technological Field

The present invention relates to a color parameter generation apparatus, an execution apparatus and a non-transitory computer-readable recording medium.

Description of Related Art

Conventionally, an apparatus has been known, which reads a sample image serving as a sample of a printed matter by an image reading apparatus (e.g., scanner), and, based on the read information, generates a color parameter in the case of forming the printed matter in image forming apparatus.

In a device such as an image reading apparatus (e.g., scanner) or an image forming apparatus, a color value output by the device (RGB value or CMYK value) becomes the color value that depends on the device. Accordingly, the color value of the read information of the image reading apparatus may not match the color value output by the image forming apparatus; thus, in a case where information of the color value is transferred between these devices, color conversion is performed using a predetermined color conversion table (device profile) for converting the color value to a color value independent of the devices.

The apparatus for generating the color parameter for the image forming apparatus and related to the above-described sample image generates the color parameters for the image forming apparatus, using a device profile such as a scanner profile for the image reading apparatus.

In the image reading apparatus, in a case where an image is read, the read image is affected by a flare. The flare is a phenomenon in which the image reading apparatus obtains color information including a mixture of reflected light in each area of the image to be read and reflected light from the periphery of each area caused by a diffused reflection are mixed.

The scanner profile is generated based on the color value read from a chart image in which patches of a plurality of colors are arranged, and thus, each of the colors set by the scanner profile is affected by the flare based on the arrangement of the patches.

For example, in Japanese Patent Application Laid-Open No. 2016-159540, a configuration is known, in which an arrangement order of the patches in the chart image at the time of generating the scanner profile is changed in order to equalize the degree of influence of the flare in each color. This suppresses variations in the degree of influence of the flare in each color.

SUMMARY

However, the sample image read by the apparatus for generating the color parameter and the chart image in generating the scanner profile are different images from each other. Thus, in a case where the degree of influence of the flare at a predetermined position of the read image, which is the read information of the sample image, differs from the degree of influence of the flare of the color corresponding to the predetermined position of the scanner profile, there is a possibility that an accurate color parameter cannot be generated at the predetermined position. In particular, in a case where the color used for the predetermined position of the read image is strongly affected by the flare, the printed matter of the sample image may be printed in an erroneous color.

An object of the present invention is to provide a color parameter generation apparatus capable of accurately generating a color parameter based on a read image, an execution apparatus and a non-transitory computer-readable recording medium.

To achieve at least one of the abovementioned objects, according to an aspect of the present invention, a color parameter generation apparatus reflecting one aspect of the present invention includes:

a hardware processor that generates a color parameter to be used for printing a sample image based on a read image being read information of the sample image, wherein the hardware processor determines a degree of a flare at a predetermined position of the read image, and executes predetermined processing for correcting the color parameter in the predetermined position, based on the determined degree of the flare.

To achieve at least one of the abovementioned objects, according to another aspect of the present invention, an execution apparatus reflecting one aspect of the present invention relates to a color parameter generation apparatus that generates a color parameter to be used for printing a sample image, based on a read image being read information of the sample image, the execution apparatus including:

a hardware processor that determines a degree of a flare at a predetermined position of the read image, and wherein the hardware processor executes predetermined processing for correcting the color parameter in the predetermined position based on the determined degree of the flare.

To achieve at least one of the abovementioned objects, according to another aspect of the present invention, a non-transitory computer-readable recording medium reflecting one aspect of the present invention stores a program for a color parameter generation apparatus, the program causing a computer to perform:

generating a color parameter to be used for printing a sample image based on a read image being read information of the sample image;

determining a degree of a flare at a predetermined position of the read image; and executing predetermined processing for correcting the color parameter in the predetermined position based on the determined degree of the flare.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 describes generation of a second target profile;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
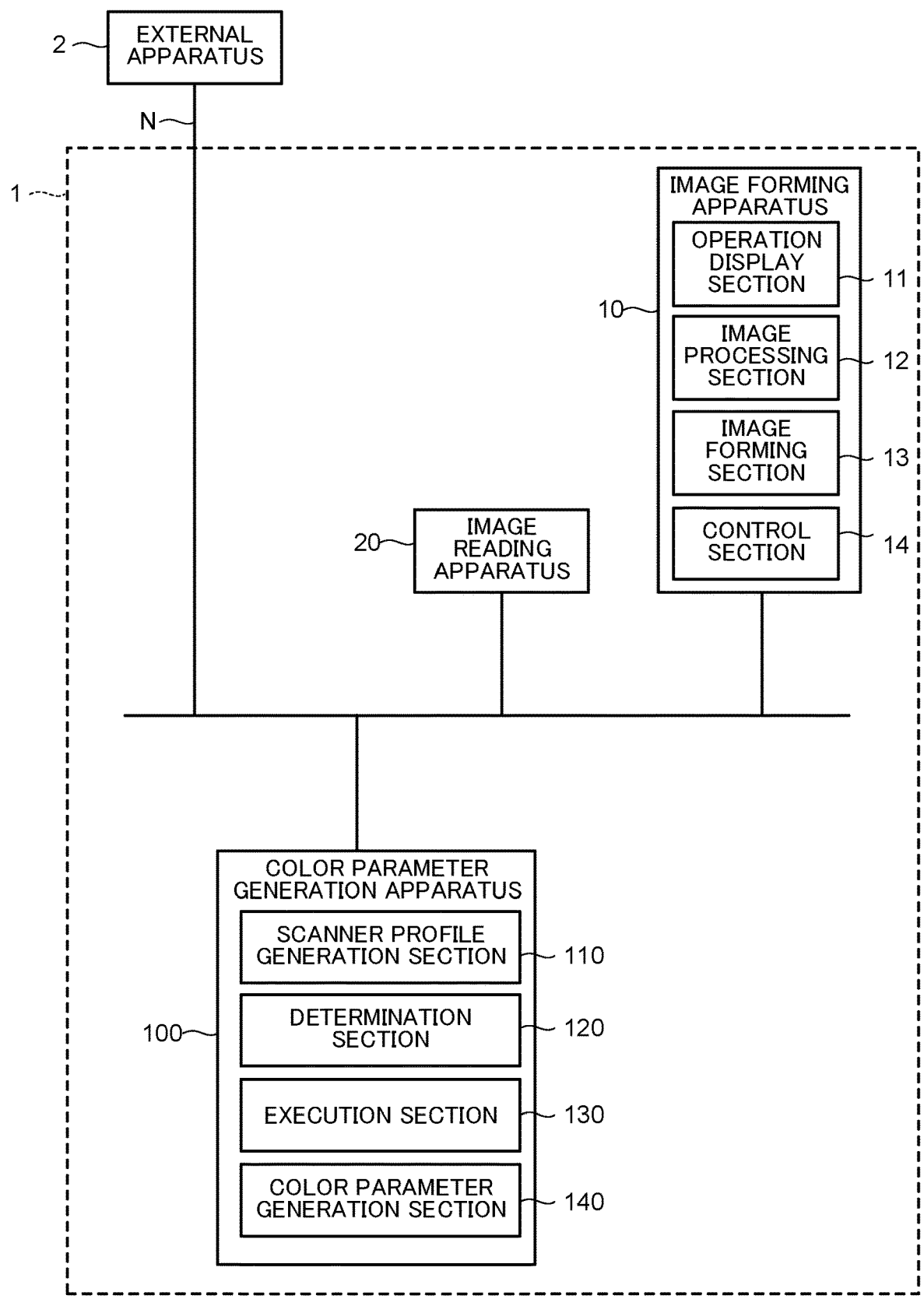
FIG. 1 illustrates a schematic configuration of a printing system to which a color parameter generation apparatus according to an embodiment of the present invention is applied.

Hereinafter, an embodiment of the present invention will be described in detail with reference to the accompanying drawings. FIG. 1 illustrates a schematic configuration of printing system 1 to which color parameter generation apparatus 100 according to an embodiment of the present invention is applied.

As illustrated in FIG. 1, printing system 1 is a system that is connected to external apparatus 2 (e.g., computer device such as a personal computer) via a publicly known communication network N and performs printing based on a print job input from a user of external apparatus 2.

Printing system 1 is a system capable of performing printing by adjusting, for example, based on a sample image, a color parameter so that the printed matter matches the color of the sample image. The sample image is an image serving as a sample of image data in the print job and is an image previously formed on a recording medium.

Printing system 1 includes image forming apparatus 10, image reading apparatus 20, and color parameter generation apparatus 100. Image forming apparatus 10, image reading apparatus 20 and color parameter generation apparatus 100 are connected via the communication network N.

Image forming apparatus 10 obtains image data based on the print job via color parameter generation apparatus 100 and forms an output image based on the image data on the recording medium. Image forming apparatus 10 includes operation display section 11, image processing section 12, image forming section 13 and control section 14 and the like.

Control section 14 includes a Central Processing Unit (CPU), a Read Only Memory (ROM), a Random Access Memory (RAM), and the like. CPU reads a program corresponding to processing contents from the ROM and loads the program into the RAM, and controls operation of, for example, each block of image forming apparatus 10 in a centralized manner in cooperation with the loaded program.

Operation display section 11 is configured of, for example, a Liquid Crystal Display (LCD) with a touch-screen and functions as a display section and an operation section. The display section displays various operation screens, the status of images, the operation status of the respective functions, and the like in accordance with display control signals input from control section 14. The operation section includes various operation keys such as a numeric keypad and a start key and receives various input operations by the user to output the operation signal to control section 14.

Image processing section 12 performs color conversion using a previously generated printer profile and target profile.

The first color value (e.g., CMYK value) depending on image forming apparatus 10 and the second color value (e.g., $L^*a^*b^*$ value) are associated with each other in the printer profile. The printer profile is preset and stored in a storage section or the like.

The second color value is an independent color value from devices such as image forming apparatus 10 or image reading apparatus 20 to be described below, and a color value measured by, for example, an external colorimetric apparatus.

The target profile in which the above described second color value and a standard color value (e.g., CMYK value) that conforms to a predetermined standard are associated with each other is stored in the storage section or the like. Image processing section 12 uses the first target profile and the second target profile which are modified or corrected by color parameter generation apparatus 100 described below based on the read color value read by image reading apparatus 20.

Image processing section 12 performs the color conversion through the printer profile and the target profile, performs image processing such as gradation processing on the image data after color conversion, and outputs the resultant image to image forming section 13.

Image forming section 13, based on the image data after image processing, performs image forming on the recording medium by using a printing method of image forming apparatus 10 (e.g., a laser method or an ink jet method).

Image reading apparatus 20 is, for example, a scanner, which reads image formed on the recording medium and outputs color values (e.g., RGB values) of the read image serving as the read information. As the image formed on the recording medium, for example, a chart image for generating the scanner profile, and/or the sample image described above is included. The chart image is an image (color chart) in which, for example, patch images of a plurality of colors are arranged.

Color parameter generation apparatus 100 is, for example, a computer device such as a personal computer, and includes a CPU, a ROM, a RAM, and the like. Color parameter generation apparatus 100 includes scanner profile generation section 110, determination section 120, execution section 130, and color parameter generation section 140 to generate color parameters to be used in image forming, based on the read image in image forming apparatus 10.

Scanner profile generation section 110 generates a scanner profile in which the read color value of the read image read by image reading apparatus 20 is associated with the above-described second color value (e.g., L * a * b * value) independent of image reading apparatus 20 or the like.

Scanner profile generation section 110 generates a scanner profile by obtaining read color values (e.g., RGB values) of the read image of the chart image for generating the above-described scanner profile from image reading apparatus 20 and generating a table in which the read color values are associated with the second color value (L * a * b * value). The scanner profile is stored in a storage section or the like (not illustrated).

In addition, scanner profile generation section 110 calculates the degree of influence of a flare (hereinafter, referred to as flare influence degree) for read color values of the chart image and associates the read color values with read color values of the scanner profile. The flare is a phenomenon in which the image reading apparatus obtains color information including a mixture of reflected light at any position of the read image and reflected light from the periphery of the position caused by a diffused reflection are mixed.

The flare influence degree is calculated based on an average of the color values in the peripheral area of the position including the position of an subject color and is stored in, for example, the storage section. The flare influence degree is calculated, for example, as an average of the read color values of a peripheral patch including the read color values (RGB values) obtained from a predetermined patch in the read image of the chart image. The peripheral patch is, for example, a patch group constituted of a predetermined patch and a plurality of patches surrounding the predetermined patch. The number of patches constituting the peripheral patch can be set optionally.

Figure 2:
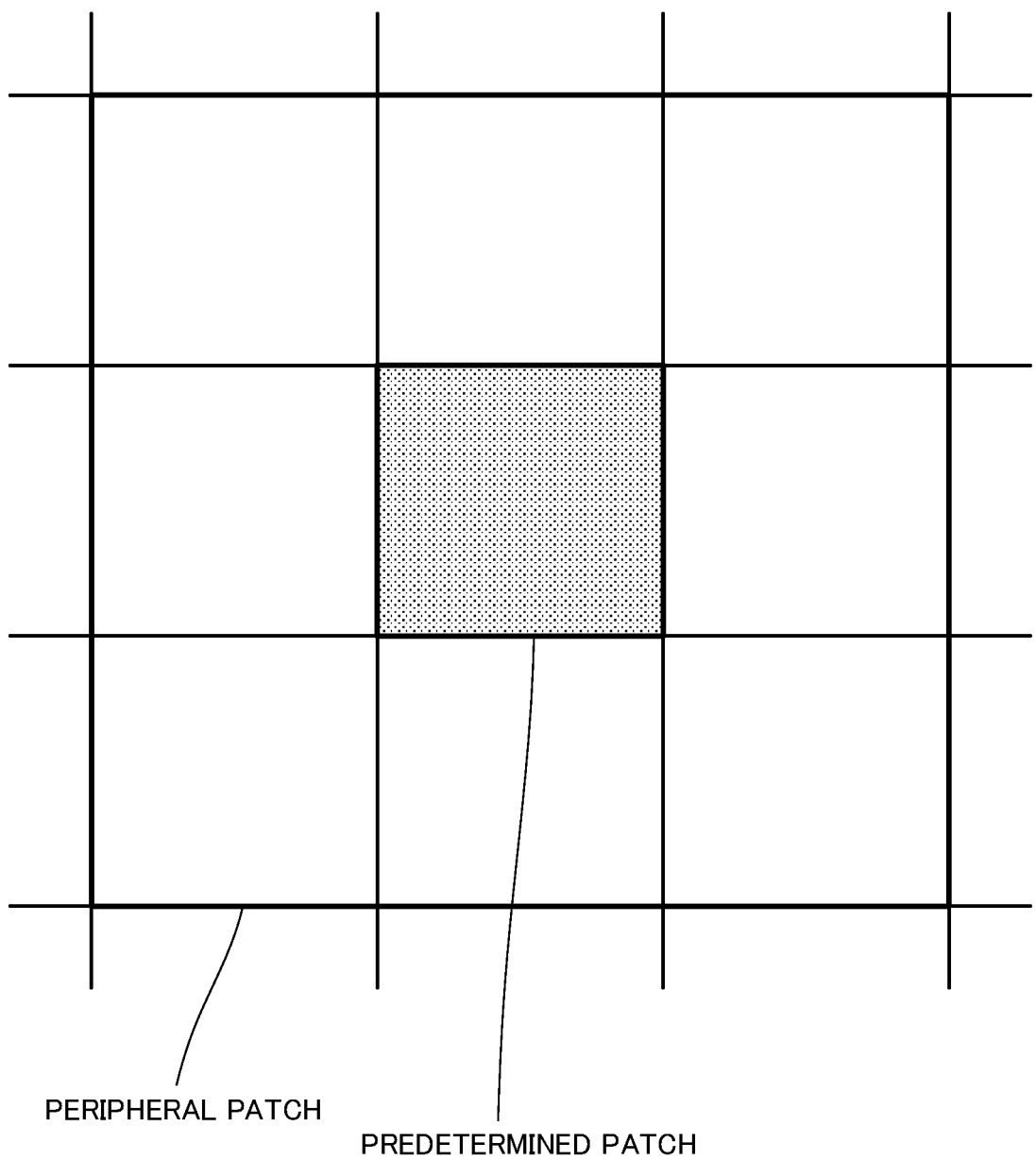
FIG. 2 describes a calculation of a degree of a flare.

For example, as illustrated in FIG. 2, in a case where the number of patches constituting the peripheral patch is 9, the predetermined patch is located at the center of the patch group of 3×3. The average of read color values of peripheral patch is the average of the read color values of 9 patches including the predetermined patch.

Incidentally, for example, as described in Japanese Patent Application Laid-Open No. 2016-159540, the chart image may be set so that the flare influence degree is uniform in each color. This enables suppressing variations in the flare influence degree of each color of the scanner profile, and thus, the color conversion can be easily performed accurately.

Determination section 120 determines the degree of a flare (hereinafter, may also referred to as "flare degree") at a plurality of predetermined positions of the read image being the read information of the sample image. The predetermined position, for example, indicates a center coordinate position within a predetermined area (e.g., a range of 10 pixels×10 pixels). The predetermined area is determined in order to take an error such as positional displacement into consideration.

First, determination section 120 calculates the flare influence degree at the predetermined position. The flare influence degree calculated by determination section 120 (hereinafter, the first flare influence degree) is an average of the read color values of all the pixels of the peripheral pixels including the read color value of the pixel of the above described center coordinate position. Note that, the number of peripheral pixels is set under the same condition as the flare influence degree calculated in the scanner profile (hereinafter, the second flare influence degree).

Determination section 120, then, compares the calculated first flare influence degree with the second flare influence degree set in the scanner profile and determines whether the difference value (flare degree) between the first flare influence degree and the second flare influence degree is greater than a predetermined threshold value. Determination section 120 executes the above determination processing for each predetermined position.

The predetermined threshold value is a value that serves as an index indicating that the flare influence degree in the read image of the sample image is relatively large with respect to the flare influence degree in the read image of the chart image. The predetermined threshold value can be appropriately set.

Execution section 130 executes predetermined processing for correcting the target profile (color parameter) at the predetermined position based on the flare degree determined by determination section 120. Execution section 130 executes the predetermined processing in a case where the flare degree is greater than the predetermined threshold value.

The predetermined processing is processing of notifying the user so as to cause the user to select whether to correct the color parameter at the predetermined position.

As the processing of notifying the user, the following processing is exemplified: processing of displaying on the screen of external apparatus 2 to the user or processing of generating a sound from external apparatus 2.

Execution section 130, for example, among a plurality of predetermined positions, groups an execution predetermined position determined to execute the predetermined processing for each flare degree. The flare degree is distinguished, for example, into three levels: high, middle, and low.

A high flare degree indicates that the influence of the flare is considerably large. A low flare degree indicates that the influence of the flare is relatively large, although it is not as large as the high flare degree. A middle flare degree indicates that the influence of the flare is smaller than the high flare degree, but larger than the low flare degree.

Figure 3A:
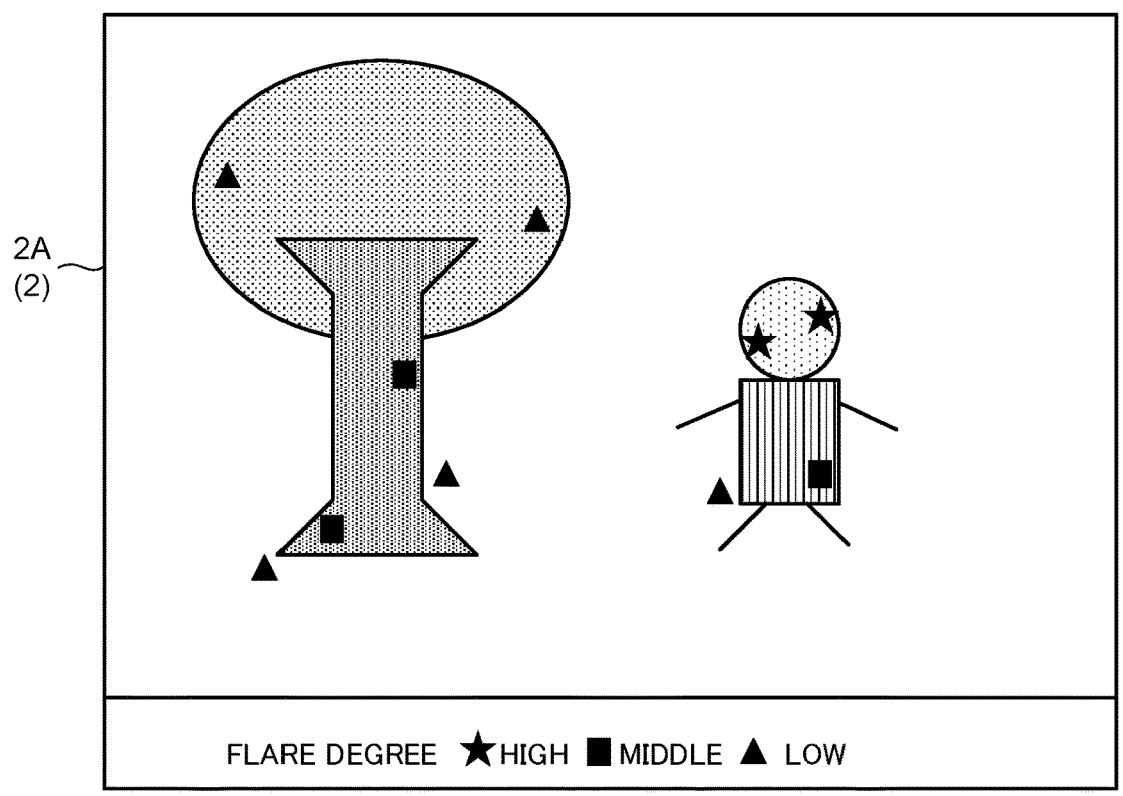
FIG. 3A illustrates an exemplary display screen of an external apparatus in which a predetermined processing is executed.

As illustrated in FIG. 3A, execution section 130, for example, as predetermined processing, displays figures indicating the flare degree with stars, squares, triangles, or the like on display screen 2A of external apparatus 2 by superimposing on the read image. In FIG. 3A, stars indicate the high flare degree, squares indicate the middle flare degree, and triangles indicate the low flare degree.

Figure 3B:
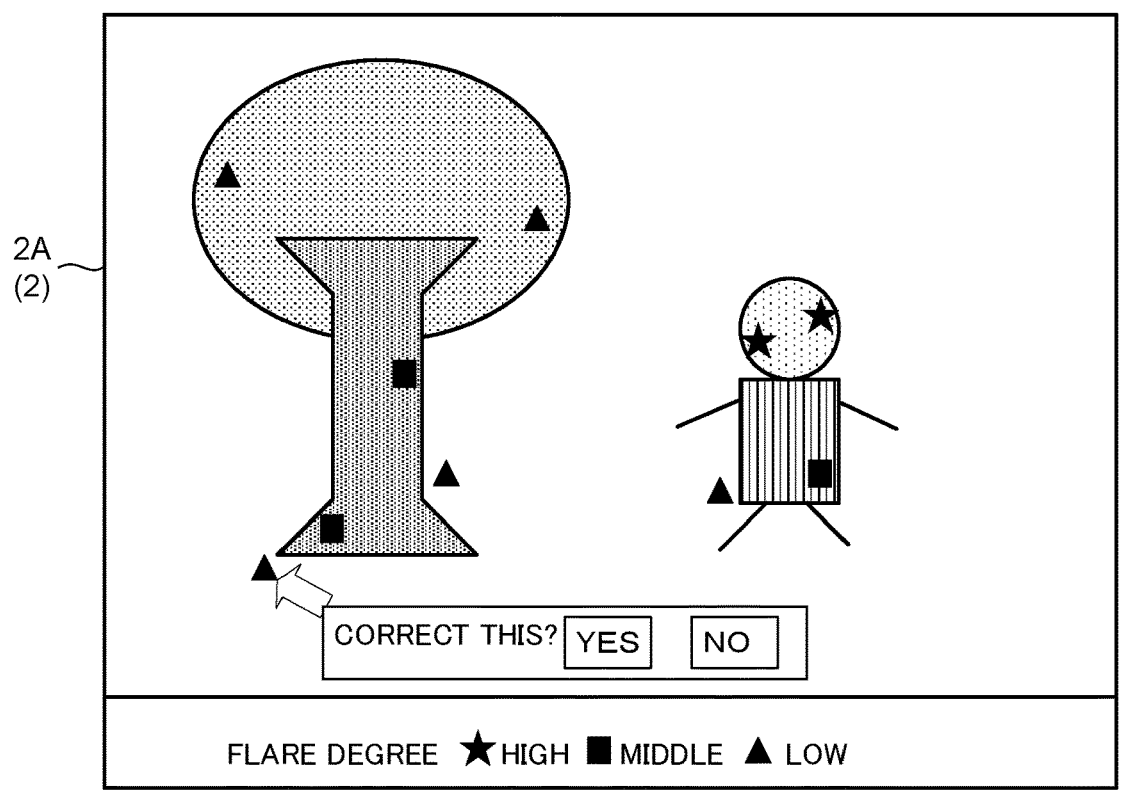
FIG. 3B illustrates an exemplary display screen of the external apparatus in which the predetermined processing is executed FIG. 4A describes generation of a color conversion table based on a read color value and a third color value.

As illustrated in FIG. 3B, in a case where the user operates the cursor to indicate the figure, execution section 130 displays a selection instruction for whether to correct the color parameter on display screen 2A.

Thus, the user can be easily notified of the position strongly affected by the flare. In addition, since the user can select whether to execute the correction, a printed matter based on the sample image can be generated according to the preference of the user.

Figure 4A:
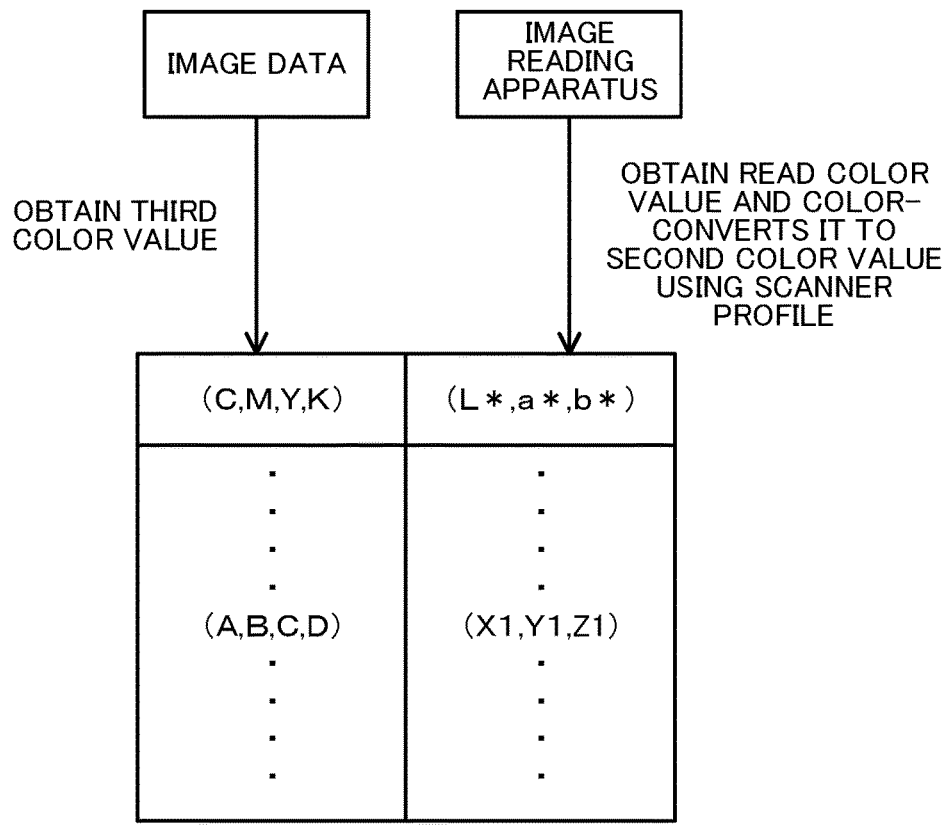
FIG. 4B describes generation of a first target profile.

Color parameter generation section 140 generates color parameters to be used for printing the sample image based on the read image being the read information of the sample image. Specifically, as illustrated in FIG. 4A, color parameter generation section 140 extracts the third color value (e.g., CMYK value) at each position of the sample image based on the image data of the sample image.

Color parameter generation section 140 obtains a read color value (RGB value) at each position of the read image based on the sample image from image reading apparatus 20 and converts the read color value to the second color value (L * a * b * value) using the scanner profile.

Color parameter generation section 140 generates a color conversion table in which the third color value and the second color value are associated with each other and corrects the preset target profile. In FIG. 4A, an example is indicated in which C, M, Y, and K constituting the third color value are, respectively, A, B, C, and D (optional values), and L*, a*, and b* relating to the read color value corresponding thereto are, respectively, X1, Y1, and Z1 (optional values).

Figure 4B:
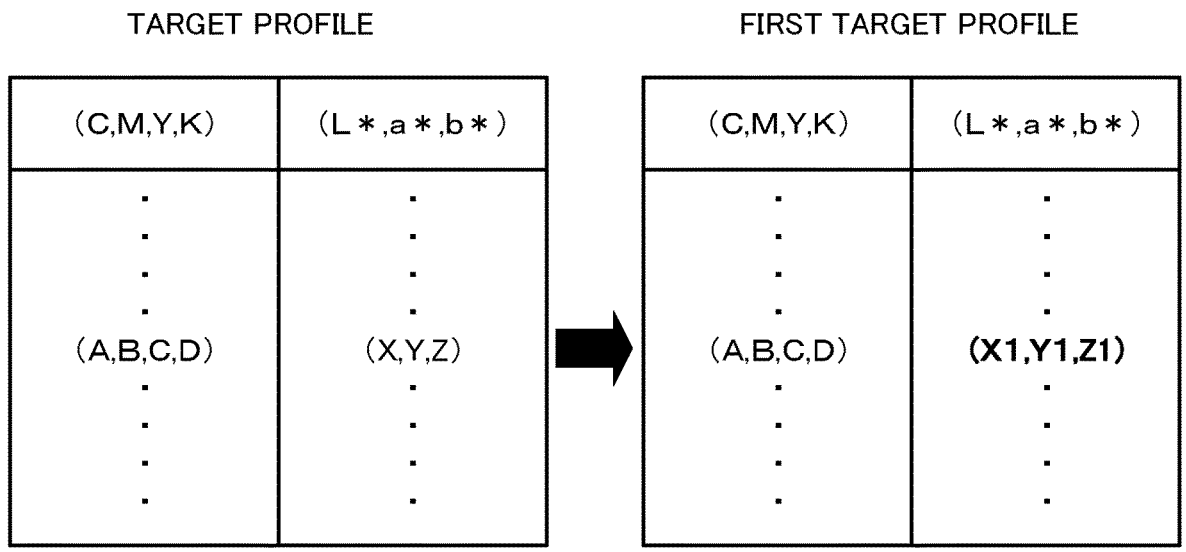

Specifically, as illustrated in FIG. 4B, color parameter generation section 140 corrects the second color value set in the target profile to the read color value by comparing the third color value for the color used in the sample image with the standard color value for target profile and corresponding to the color used in the sample image.

That is, color parameter generation section 140 generates a first target profile (first color parameters) based on the read color value at each position of the read image. In FIG. 4B, an example is indicated in which L*, a*, and b* constituting the second color value corresponding to A, B, C, and D, which are the standard color values (CMYK values) of target profile, are, respectively, X, Y, and Z (optional values). In the example indicated in FIG. 4B, X, Y, and Z, which are the second color values of the target profile, are, in the first target profile, modified to, respectively, X1, Y1, and Z1, which are the read color values illustrated in FIG. 4A.

When receiving from the user an instruction to correct a color parameter at a predetermined position of the read image of the sample image, color parameter generation section 140 corrects the first color parameter (first target profile) to a second color parameter different from the first color parameter. In other words, color parameter generation section 140 corrects the first color parameter at the predetermined position of the read image to the second color parameter based on the execution result by execution section 130.

The second color parameter is, for example, a color parameter in which a color value at a predetermined position to be corrected, that is, a color parameter which is the first flare influence degree is set as a color value such that a difference value (flare degree) between the first flare influence degree and the second flare influence degree is canceled out.

The predetermined position to be corrected indicates, as described above, a position that is notified to the user by execution section 130 and is selected by the user to be corrected.

That is, in FIG. 3B, in a case where the user selects "YES", the predetermined position becomes the predetermined position to be corrected, and in this case, color parameter generation section 140 corrects the first color parameter at the predetermined position to the second color parameter.

Note that, in a case where the user selects "NO", color parameter generation section 140 does not correct the color parameters at the predetermined position.

Color parameter generation section 140 corrects the color value at the predetermined position to be corrected so that the difference value between the first flare influence degree and the second flare influence degree is canceled out. Color parameter generation section 140 reflects the corrected color value to the above target profile (color parameter).

Specifically, as illustrated in FIG. 5, color parameter generation section 140 generates, for example, a second target profile corresponding to the predetermined position to be corrected separately from the first target profile. Thus, image forming apparatus 10 uses the first target profile when performing the color conversion at the position not affected by the flare, while using the second the target profile when performing the color conversion at the predetermined position.

In an example illustrated in FIG. 5, X1, Y1, and Z1, which are the second color values in the first target profile, are corrected, respectively, to X2, Y2, and Z2 (optional value) in the second target profile.

This allows accurately generating the color parameters based on the sample image, that is, producing a printed matter in accordance with the color parameters.

Figure 6:
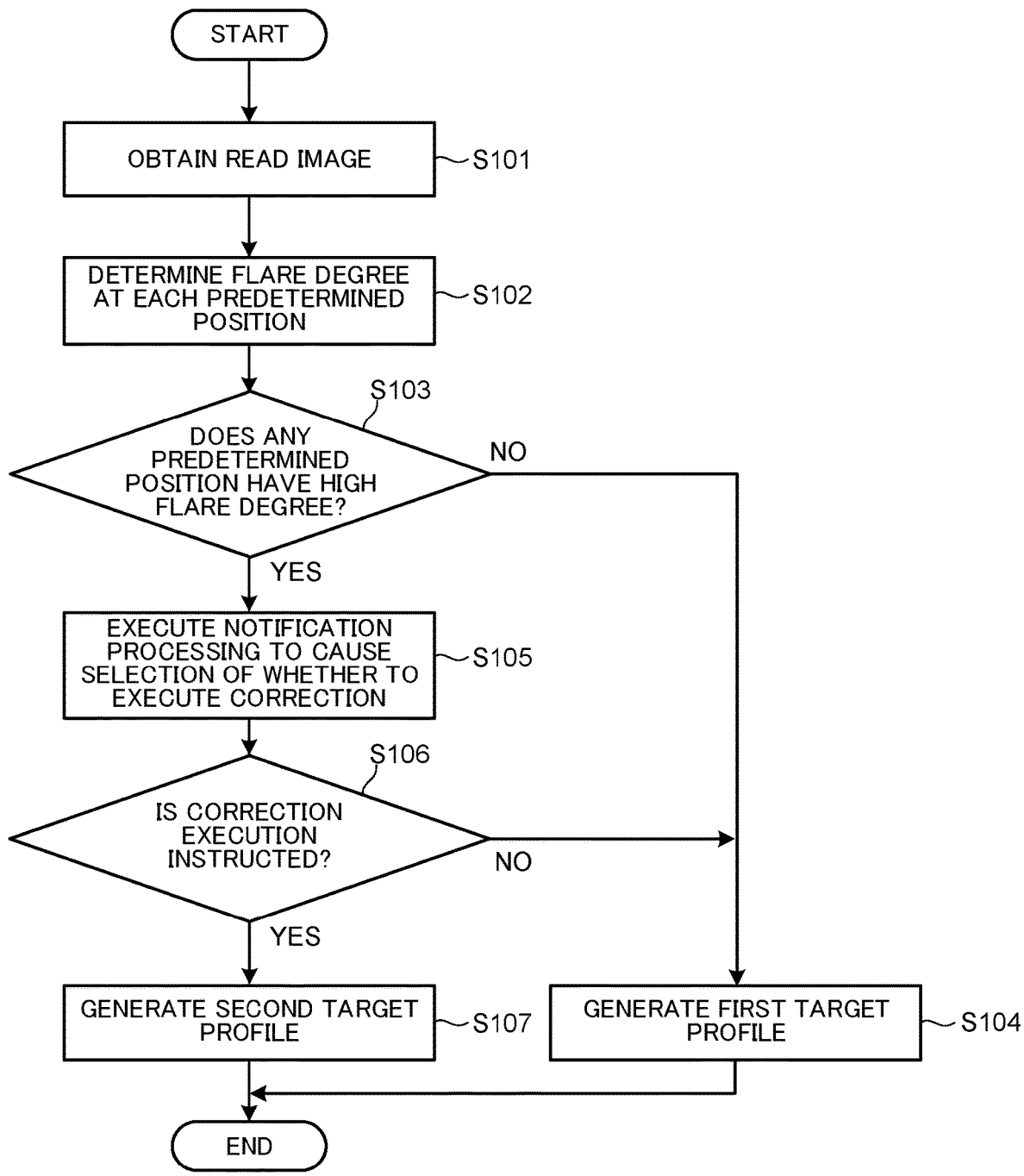
FIG. 6 is a flowchart illustrating an exemplary operation of color parameter generation control in a color parameter generation apparatus.

A description will be given of an exemplary operation of a color parameter generation control in color parameter generation apparatus 100 configured as described above. FIG. 6 is a flowchart illustrating an exemplary operation of color parameter generation control in color parameter generation apparatus 100. Processing in FIG. 6, for example, is appropriately executed in a case where color parameter generation apparatus 100 receives an execution instruction of the print job from external apparatus 2.

As illustrated in FIG. 6, color parameter generation apparatus 100 obtains the read image based on the sample image from image reading apparatus 20 (step S101) and determines the flare degree at each predetermined position (step S102).

Next, color parameter generation apparatus 100 determines whether any position has a high flare degree (step S103). Specifically, color parameter generation apparatus 100 determines whether any position has a flare degree which is greater than a predetermined threshold value.

As a result of the determination, in a case where no position has a high flare degree (step S103, NO), color parameter generation apparatus 100 generates a first target profile (step S104). Note that, the first target profile may be generated after obtaining of the read image (after step S101).

On the other hand, in a case where any position has a high flare degree (step S103, YES), color parameter generation apparatus 100 executes notification processing for selecting whether to execute the correction (step S105).

Next, color parameter generation apparatus 100 determines whether a correction execution is instructed (step S106). As a result of the determination, in a case where no correction execution is instructed (step S106, NO), the processing proceeds to step S104.

On the other hand, in a case where the correction execution is instructed (step S106, YES), color parameter generation apparatus 100 generates a second target profile (step S107). Note that, in step S107, the first target profile is also generated. After step S104 or step S107, the control ends.

According to the present embodiment configured as described above, based on the flare degree at the predetermined position of the read image, the predetermined processing for correcting the color parameter at the predetermined position is executed. Specifically, since execution section 130 executes processing of notifying the user so as to cause the user to select whether to correct the color parameter at the predetermined position, in a case where the user selects to correct, color parameter generation section 140 corrects the color parameter at the predetermined position.

As a result, in a case where the flare influence degree of the read image is different between the chart image and the sample image, the difference in the respective flare influence degrees can be absorbed, and thus, the color parameters based on the read image of the sample image can be accurately generated.

In addition, notifying the user to select whether to correct the color parameter at the predetermined position allows the user to confirm whether the predetermined position is affected by the flare, and thus to select whether to execute the correction of the color parameter. As a result, color parameters can be generated based on the printed matter assumed by the user.

Further, since execution section 130 groups a plurality of predetermined positions for each flare degree, the user can easily recognize the flare degree for each position.

In the above-described embodiment, execution section 130 executes the predetermined processing in a case where the flare degree at the predetermined position in the read image is greater than the predetermined threshold value; however, the present invention is not limited thereto. For example, execution section 130 may determine whether to execute the predetermined processing based on the color of the predetermined position.

Specifically, execution section 130 determines not to execute the predetermined processing in a case where the color of the predetermined position is, for example black, which is a predetermined color not easily affected by flare, and thus does not execute the predetermined processing in this case.

Color parameter generation section 140, then, reflects the read color value of the predetermined color in the read image in the first target profile.

This enables generating the color parameters with respect to the predetermined color without the determination or the like of the user, and thus, the process of generating the color parameters can be simplified.

Figure 7:
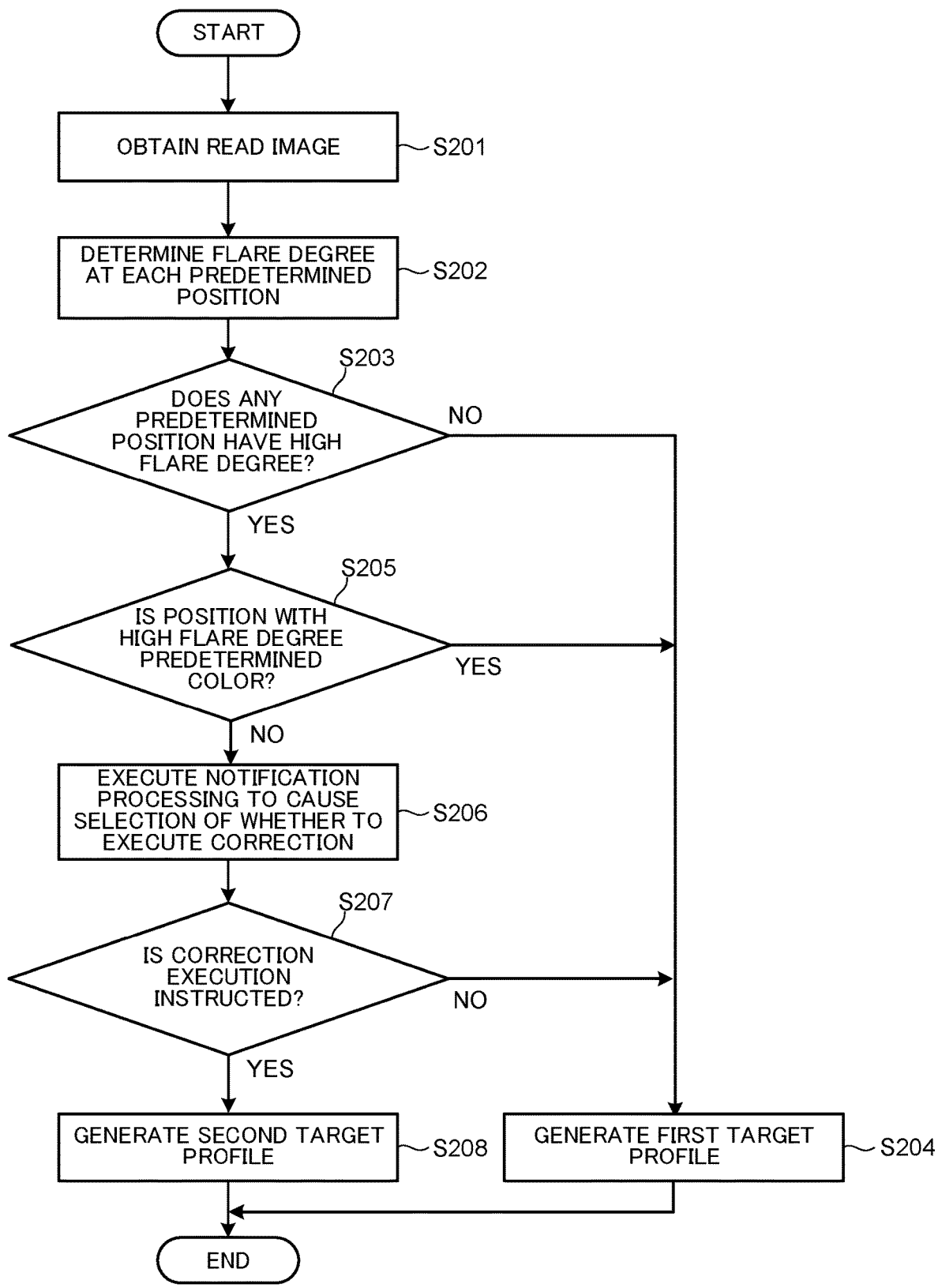
FIG. 7 is a flowchart illustrating an exemplary operation of color parameter generation control in a color parameter generation apparatus.

Next, a description will be given of an exemplary operation of a color parameter generation control in color parameter generation apparatus 100 according to the present embodiment. FIG. 7 is a flowchart illustrating an exemplary operation of color parameter generation control in color parameter generation apparatus 100. Processing in FIG. 7, for example, is appropriately executed in a case where color parameter generation apparatus 100 receives an execution instruction of the print job from external apparatus 2.

As illustrated in FIG. 7, color parameter generation apparatus 100 obtains the read image based on the sample image from image reading apparatus 20 (step S201) and determines the flare degree at each predetermined position (step S202).

Next, color parameter generation apparatus 100 determines whether any position has a high flare degree (step S203). Specifically, color parameter generation apparatus 100 determines whether any position has a flare degree which is greater than a predetermined threshold value.

After the determination, in a case where no position has a high flare degree (step S203, NO), color parameter generation apparatus 100 generates a first target profile (step S204).

On the other hand, in a case where any position has a high flare degree (step S203, YES), color parameter generation apparatus 100 determines the position with the high flare degree is a predetermined color (step S205).

As a result of the determination, in a case where the position with the high flare degree is a predetermined color (step S205, YES), the processing proceeds to step S204. On the other hand, in a case where the position with the high flare degree is not a predetermined color (step S205, NO), color parameter generation apparatus 100 executes notification processing for selecting whether to execute the correction (step S206).

Next, color parameter generation apparatus 100 determines whether a correction execution is instructed (step S207). As a result of the determination, in a case where no correction execution is instructed (step S207, NO), the processing proceeds to step S204.

On the other hand, in a case where the correction execution is instructed (step S207, YES), color parameter generation apparatus 100 generates a second target profile (step S208). Note that, in step S208, the first target profile is also generated. After step S204 or step S208, the control ends.

In such a configuration, the color parameters based on the read image can also be accurately generated.

In addition, execution section 130 may automatically execute correction instruction processing of the color parameter as the predetermined processing in accordance with the flare degree at the predetermined position of the read image.

By way of example, in a case where the flare degree in the read image is, for example, equal to or higher than the first level and is lower than the second level, execution section 130 executes the above described correction instruction processing in color parameter generation section 140.

The first level refers to, for example, an extent of a level that represents a relatively high flare degree but is difficult for the user to determine the flare degree, as viewed from the user, and can be appropriately set. The second level refers to, for example, an extent of a level that represents a high flare degree and also allows the user to clearly determine the flare degree as viewed from the user, and can be appropriately set.

Figure 8:
FIG. 8 describes a correction of the read color value.

In this case, color parameter generation section 140 corrects the read color values. For example, as illustrated in FIG. 8, assuming that the read color values (L * a * b * values) based on the read image are 10, 0, and 0, and the corresponding color values in target profile are 8, 0, and 0.

Here, in a case where the flare degree of the position based on the read color values is equal to or higher than the first level and is lower than the second level, color parameter generation section 140 corrects the read color values to, for example, 9, 0, and 0, which are average values between the color conversion table and the target profile. This enables generating the color parameters without the determination or the like of the user, and thus, the process of generating the color parameters can be simplified.

Figure 9:
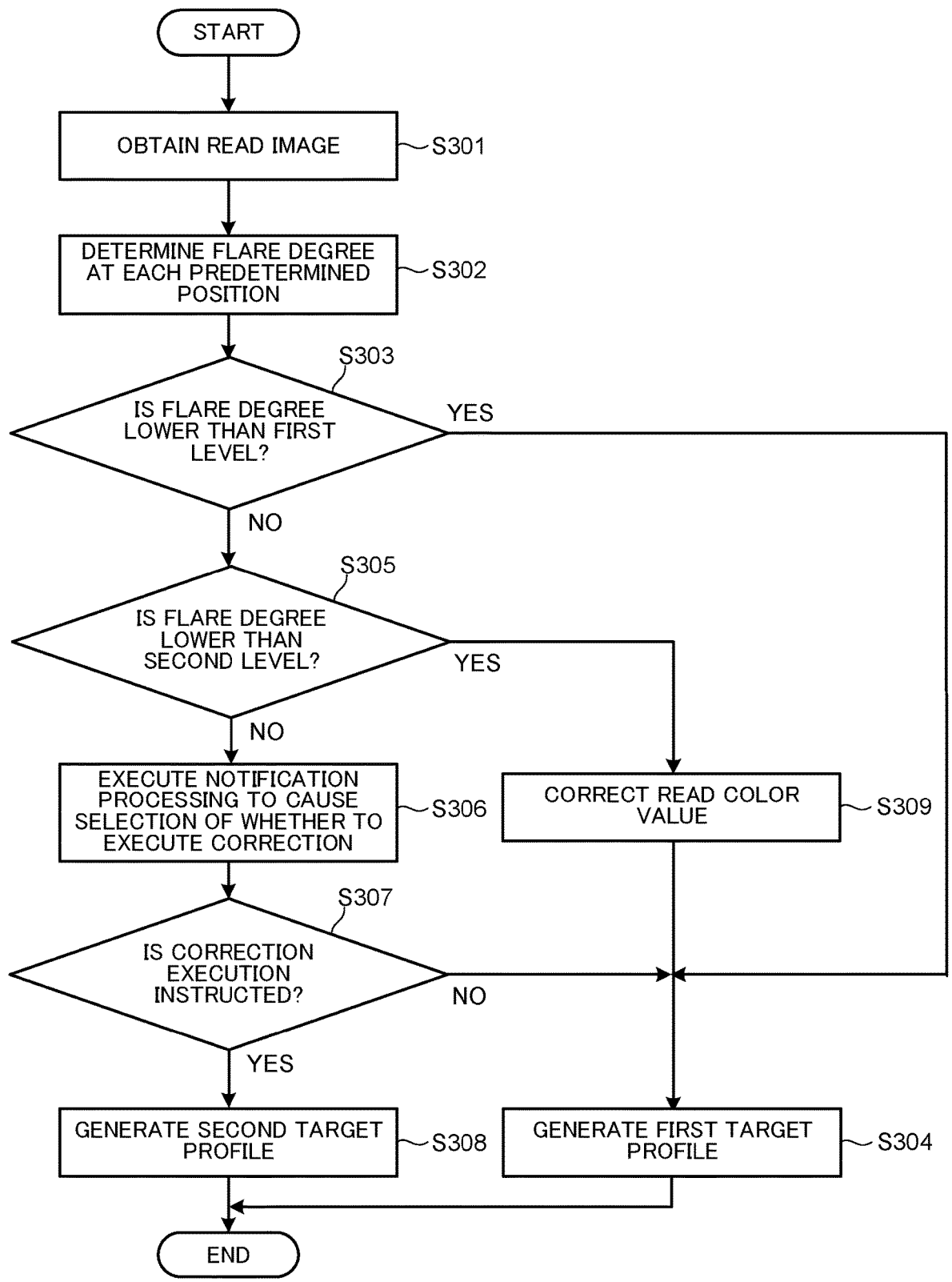
FIG. 9 is a flowchart illustrating an exemplary operation of color parameter generation control in a color parameter generation apparatus.

Next, a description will be given of an exemplary operation of a color parameter generation control in color parameter generation apparatus 100 according to the present embodiment. FIG. 9 is a flowchart illustrating an exemplary operation of color parameter generation control in color parameter generation apparatus 100. Processing in FIG. 9, for example, is appropriately executed in a case where color parameter generation apparatus 100 receives an execution instruction of the print job from external apparatus 2.

As illustrated in FIG. 9, color parameter generation apparatus 100 obtains the read image based on the sample image from image reading apparatus 20 (step S301) and determines the flare degree at each predetermined position (step S302).

Next, color parameter generation apparatus 100 determines whether or not the flare degree is lower than the first level (step S303). As a result of the determination, in a case where the flare degree is lower than the first level (step S303, YES), color parameter generation apparatus 100 generates the first target profile (step S304).

On the other hand, in a case where the flare degree is equal to or higher than the first level (step S303, NO), color parameter generation apparatus 100 determines whether the flare degree is lower than the second level (step S305).

As a result of the determination, in a case where the flare degree is equal to or higher than the second level (step S305, NO), color parameter generation apparatus 100 e executes notification processing for selecting whether to execute the correction (step S306).

Next, color parameter generation apparatus 100 determines whether a correction execution is instructed (step S307). After the determination, in a case where no correction execution is instructed (step S307, NO), the processing proceeds to step S304.

On the other hand, in a case where the correction execution is instructed (step S307, YES), color parameter generation apparatus 100 generates a second target profile (step S308). Note that, in step S308, the first target profile is also generated.

Returning to the determination of step S305, in a case where the flare degree is lower than the second level (step S305, YES), color parameter generation apparatus 100 corrects the read color value (step S309) and the processing proceeds to step S304. After step S304 or stepping 5308, the control ends.

In such a configuration, color parameters based on the read image can also be accurately generated. Further, in FIG. 9, it is determined whether to notify the user of the selection whether to execute the correction or to correct automatically in accordance with the flare degree; however, the configuration may be such that the correction is automatically performed regardless of the flare degree.

In addition, execution section 130 may execute processing of limiting a selectable range of the read image so that the user can select, in the read image, the color parameters to be used for correcting the color parameters of the position of the read image specified by the user.

For example, the user may specify a color or position for accurately reproducing, on a printed matter, a specific point in the sample image such as a human face in the sample image. In this case, determination section 120 determines whether the color gamut (e.g., within the range of 15 at the Euclidean distance), which is the same as the user-specified color or color of the position, is within the read image.

In the case of determining the color gamut which is the same as the user-specified color or color relating to position is within the read image, determination section 120 determines the flare degree for the part of the same color gamut.

Thus, in a case where the flare degree is determined as smaller than a predetermined threshold value in the part of the color gamut, execution section 130 limits the selectable range of the read image so that only the part of the color gamut is selected by the user.

Figure 10:
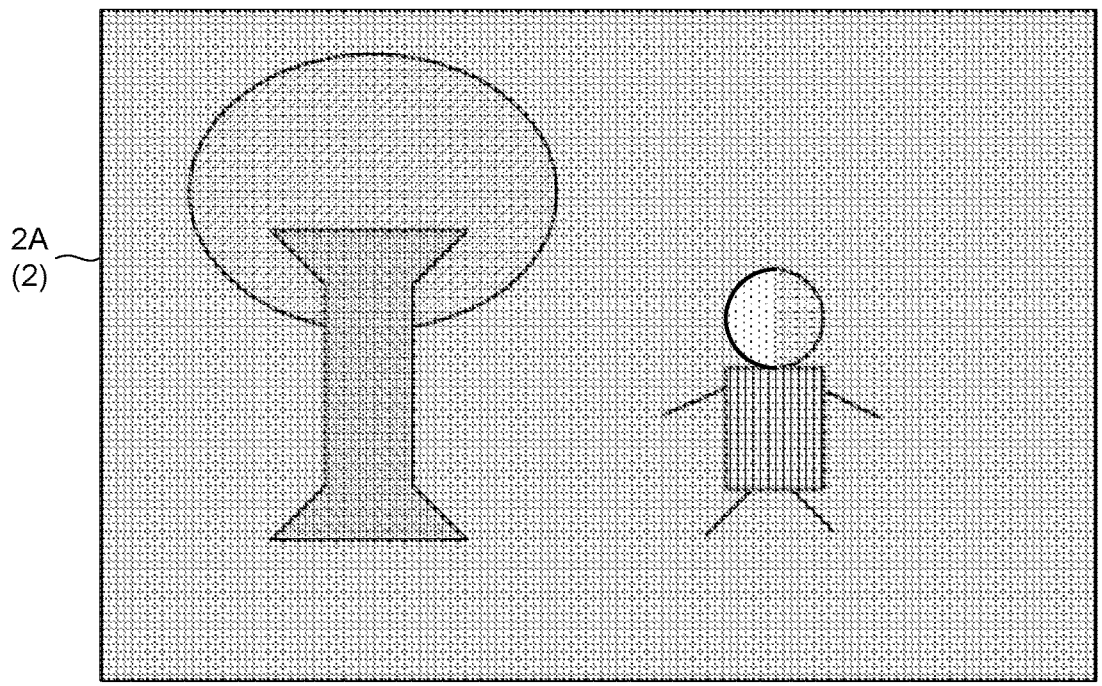
FIG. 10 illustrates an exemplary display screen of an external apparatus in which the predetermined processing is executed.

For example, as illustrated in FIG. 10, a position other than the position of the color gamut is displayed darker so that the position cannot be selected as a point to be corrected by the user. This allows the user to easily recognize a part where the flare degree is small in the color specified by the user. As a result, since a part having a small flare degree is selected with priority, color parameters corresponding to a position having a small flare degree and the same color gamut as the point can be applied to a point in the sample image where the user wishes to accurately reproduce, on the printed matter. Thus, the specified point can be accurately reproduced in the printed matter.

Figure 11:
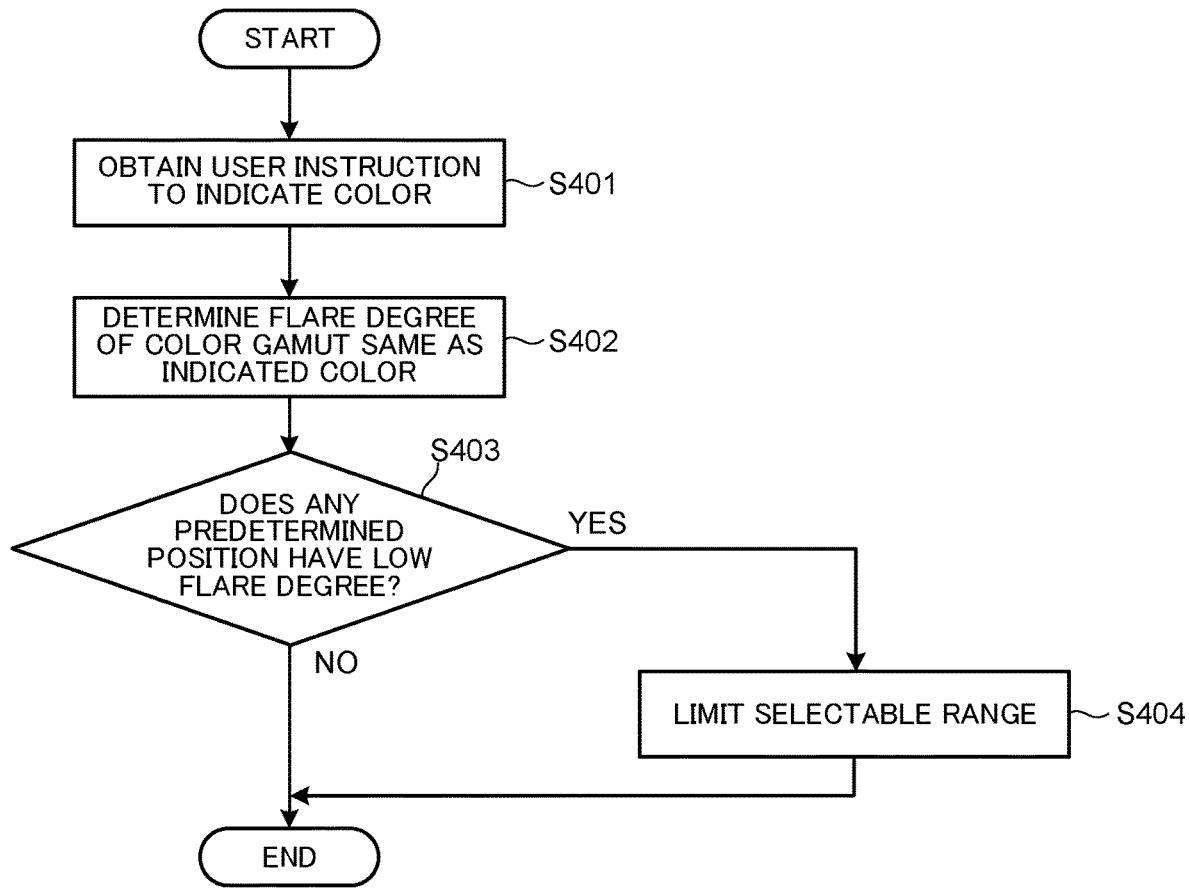
FIG. 11 is a flowchart illustrating an exemplary operation of a limit control in the color parameter generation apparatus.

Next, a description will be given of an exemplary operation of a limit control in color parameter generation apparatus 100 according to the present embodiment. FIG. 11 is a flowchart illustrating an exemplary operation of the limit control in color parameter generation apparatus 100. Processing in FIG. 11, for example, is appropriately executed in a case where color parameter generation apparatus 100 receives an execution instruction of the print job from external apparatus 2.

As illustrated in FIG. 11, color parameter generation apparatus 100 obtains an instruction for specifying a color from the user (step S401). Color parameter generation apparatus 100 determines the flare degree of the same color gamut as the specified color (step S402).

Color parameter generation apparatus 100 determines whether any position has a flare degree which is lower than a predetermined threshold value in the same color gamut as the specified color (step S403). As a result of the determination, in a case where no position has a low flare degree (step S403, NO), the control ends.

On the other hand, in a case where any position has a low flare degree (step S403, YES), color parameter generation apparatus 100 limits the selectable range (step S404). Thus, the control ends. After this, the color parameters are generated.

In such a configuration, color parameters based on the read image can also be accurately generated.

In the above embodiment, color parameter generation apparatus 100 is the personal computer; however, the present invention is not limited thereto, and, for example, color parameter generation apparatus 100 may be a computer device such as a server, or a computer device mounted on an image forming apparatus or the like.

In addition, in the above embodiment, color parameter generation apparatus 100 having color parameter generation section 140 includes functions of determination section 120 and execution section 130; however, the present invention is not limited thereto. For example, an execution apparatus (e.g., personal computer) that does not have the function of the color parameter generation section may have the functions of the determination section and the execution section.

Further, in the above embodiment, the color parameter generation apparatus has a scanner profile generation section; however, the present invention is not limited thereto, and the color parameter generation apparatus may not have the scanner profile generating section.

The embodiments described above are merely examples of specific implementation of the present invention, and the technical scope of the present invention should not be restrictively interpreted by these embodiments. That is, the present invention may be implemented in various forms without departing from the spirit thereof or the major features thereof.

Although embodiments of the present invention have been described and illustrated in detail, the disclosed embodiments are made for purposes of illustration and example only and not limitation. The scope of the present invention should be interpreted by terms of the appended claims.

What is claimed is:

1. A color parameter generation apparatus, comprising:
a hardware processor that generates a color parameter to be used for printing a sample image based on a read image being read information of the sample image, wherein
the hardware processor
determines a degree of a flare at a predetermined position of the read image, and
executes predetermined processing for correcting the color parameter in the predetermined position, based on the determined degree of the flare,
wherein the hardware processor determines the degree of the flare by comparing an influence degree of the flare at the predetermined position with an influence degree of a flare calculated based on a predetermined image.

2. The color parameter generation apparatus according to claim 1, wherein the hardware processor executes processing of notifying a user so as to cause the user to select whether to correct the color parameter in the predetermined position.

3. The color parameter generation apparatus according to claim 1, wherein
the hardware processor determines the degree of the flare at each of a plurality of the predetermined positions in the read image, and
executes the predetermined processing based on the degree of the flare at each of the plurality of predetermined positions.

4. The color parameter generation apparatus according to claim 3, wherein
the hardware processor groups execution predetermined positions for executing the predetermined processing for each of the degrees of the flares among the plurality of predetermined positions.

5. The color parameter generation apparatus according to claim 1, wherein
the influence degree of the flare is based on an average of color values in a peripheral region of the position including a position relating to a subject color.

6. The color parameter generation apparatus according to claim 1, wherein
the hardware processor determines whether to execute the predetermined processing based on a color of the predetermined position.

7. The color parameter generation apparatus according to claim 1, wherein
the hardware processor automatically executes correction instruction processing for the color parameter as the predetermined processing in accordance with the degree of the flare at the predetermined position.

8. The color parameter generation apparatus according to claim 1, wherein
the hardware processor executes processing of limiting a selectable range of the read image so as to allow a user to select, in the read image, a color parameter to be used for correcting a color parameter for a position of the read image specified by the user.

9. The color parameter generation apparatus according to claim 8, wherein
the hardware processor
in a case where a color gamut which is same as the color for the position of the read image specified by the user is within the read image, determines the degree of the flare for a part of the same color gamut, and
in a case where the degree of the flare is determined to be smaller than a predetermined threshold value in the part of the color gamut, limits the selectable range so that only the part of the color gamut is selected by the user.

10. The color parameter generation apparatus according to claim 1, wherein
the hardware processor corrects, based on a result of the execution, a first color parameter based on the read image to a second color parameter.

11. The color parameter generation apparatus according to claim 10, wherein
the hardware processor generates the second color parameter so as to cancel out the degree of the flare.

12. An execution apparatus relating to a color parameter generation apparatus that generates a color parameter to be used for printing a sample image, based on a read image being read information of the sample image, the execution apparatus comprising:
a hardware processor that determines a degree of a flare at a predetermined position of the read image, and wherein
the hardware processor executes predetermined processing for correcting the color parameter in the predetermined position, based on the determined degree of the flare, and
the hardware processor determines the degree of the flare by comparing an influence degree of the flare at the predetermined position with an influence degree of a flare calculated based on a predetermined image.

13. A non-transitory computer-readable recording medium storing a program for a color parameter generation apparatus, the program causing a computer to perform:
generating a color parameter to be used for printing a sample image based on a read image being read information of the sample image;
determining a degree of a flare at a predetermined position of the read image; and
executing predetermined processing for correcting the color parameter in the predetermined position, based on the determined degree of the flare, and
determining the degree of the flare by comparing an influence degree of the flare at the predetermined position with an influence degree of a flare calculated based on a predetermined image.

* * * * *